United States Patent
Kamalanathan

(10) Patent No.: US 7,302,681 B2
(45) Date of Patent: Nov. 27, 2007

(54) METHOD AND SYSTEM FOR CUSTOMIZED INFORMATION HANDLING SYSTEM SUPPORT UPDATES

(75) Inventor: Chandar Kamalanathan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 706 days.

(21) Appl. No.: 10/375,536

(22) Filed: Feb. 27, 2003

(65) Prior Publication Data

US 2005/0177825 A1 Aug. 11, 2005

(51) Int. Cl.
*G06F 9/44* (2006.01)

(52) U.S. Cl. ...................................................... 717/173
(58) Field of Classification Search ...................... None
See application file for complete search history.

(56) References Cited

U.S. PATENT DOCUMENTS

| | | | | |
|---|---|---|---|---|
| 5,896,566 A | * | 4/1999 | Averbuch et al. | 455/419 |
| 6,202,207 B1 | * | 3/2001 | Donohue | 717/173 |
| 6,327,617 B1 | | 12/2001 | Fawcett | 709/219 |
| 6,751,794 B1 | * | 6/2004 | McCaleb et al. | 717/168 |
| 6,754,896 B2 | * | 6/2004 | Mishra et al. | 717/176 |
| 6,766,422 B2 | * | 7/2004 | Beyda | 711/137 |
| 2002/0078222 A1 | * | 6/2002 | Compas et al. | 709/232 |
| 2002/0178254 A1 | * | 11/2002 | Brittenham et al. | 709/224 |
| 2003/0145317 A1 | * | 7/2003 | Chamberlain | 717/177 |
| 2004/0148599 A1 | | 7/2004 | Kamalanathan et al. | |
| 2004/0168121 A1 | * | 8/2004 | Matz | 715/513 |

* cited by examiner

*Primary Examiner*—Wei Zhen
*Assistant Examiner*—Chih-Ching Chow
(74) *Attorney, Agent, or Firm*—Hamilton & Terrile, LLP; Robert W. Holland

(57) ABSTRACT

A self-support module of an information handling system selectively downloads self-support updates for selected component categories from a self-support network location by periodically communicating component usage information to the network location for selection of self-support updates based on predetermined levels of component usage. For instance, a self-support usage analysis engine tracks inputs to the self-support module to identify information handling system hardware or software components that are the subject of user requests for self-support and provides the usage information to the network location to select self-support downloads of updates associated with hardware and software components subject to one or more requests for self-support.

17 Claims, 2 Drawing Sheets

METHOD AND SYSTEM FOR CUSTOMIZED INFORMATION HANDLING SYSTEM SUPPORT UPDATES

BACKGROUND OF THE INVENTION

1. Field of the Invention

The present invention relates in general to the field of information handling system support, and more particularly to a method and system for customized information handling system support updates.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have grown increasingly powerful to process more complex information with more sophisticated applications. The increased capabilities of information handling systems have led to an increased number of problems faced by users in performing operations with applications installed on information handling systems. Typically users who face difficulty in performing operations with information handling systems have relied on telephone support provided by information handling system manufacturers to resolve the difficulties. However, telephone support is expensive for information handling system manufacturers to provide and is also often unnecessary. Instead, information handling system manufacturers have developed self-support applications that run on information handling systems to help resolve user issues or problems in the operation of an information handling system. To ensure that self-support applications are maintained up-to-date, information handling system manufacturers often perform periodic synchronized updates to self-support applications in order to ensure that users who rely on self-support applications will have current information to reduce the need for users to rely on more expensive call-in telephone support.

One difficulty with updates to information handling system self-support applications is that downloads of updates to self-support applications are a waste of resources if the users will not reference the self-support application in the event of difficulties. For instance, a manufacturer may use a substantial amount of bandwidth capacity to download self-support updates with little gain where users will not use the self-support information. In addition, information handling system users will face slower network communications and less storage capacity where self-support updates are downloaded to an information handling system and then not referenced by the user. Information handling system manufacturers may reduce the size of self-support updates by targeting issues that drive calls to support centers and by limiting updates to content associated with components associated with a particular information handling system, such as components associated with a model, operating system, language or country. However, updates downloaded to an information handling system will waste system resources of both the information handling system manufacturer and user if the user does not reference the updates.

SUMMARY OF THE INVENTION

Therefore a need has arisen for a method and system which restricts self-support updates to categories relevant to an information handling system.

In accordance with the present invention, a method and system are provided which substantially reduce the disadvantages and problems associated with previous methods and systems for updating information handling system self-support applications. User behavior at an information handling system is analyzed to adapt self-support updates downloaded to the information handling system to updates associated with components of interest to the user. The size of a self-support update download is reduced with minimal impact on the user by adapting the content of the download to target components for which a user is more probable to seek self-support.

More specifically, a self-support usage log tracks user navigation through a self-support module over a defined time interval. A self-support usage analysis engine periodically reads the self-support usage log and analyzes user navigation to identify selected categories of hardware and software components for downloading of self-support updates. A support center interface communicates the selected hardware and software component categories through a network to a network location of a support service center along with a unique identifier of the information handling system. A self-support customized download module accepts the selected components from the self-support usage analysis engine of the information handling system and prepares a customized download of self-support updates associated with the selected components by referencing the unique identifier to a unique identifier database. A self-support synchronization engine downloads self-support updates for the identified components of the information handling system to update the self-support module.

The present invention provides a number of important technical advantages. One example of an important technical advantage is that self-support updates to an information handling system are restricted to categories of probable interest to the information handling system user. Targeting information handling systems to receive self-support updates of interest to the user reduces the time, bandwidth and storage size used by self-support update downloads without substantially impacting the user's access to relevant self-support information and thus reducing support calls to the information handling system manufacturer.

BRIEF DESCRIPTION OF THE DRAWINGS

The present invention may be better understood, and its numerous objects, features and advantages made apparent to those skilled in the art by referencing the accompanying

DETAILED DESCRIPTION

Self-support content of an information handling system is synchronized with updates selected based on adaptive behavior of a user with the information handling system to provide self-support tailored to the needs of information handling system's user. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
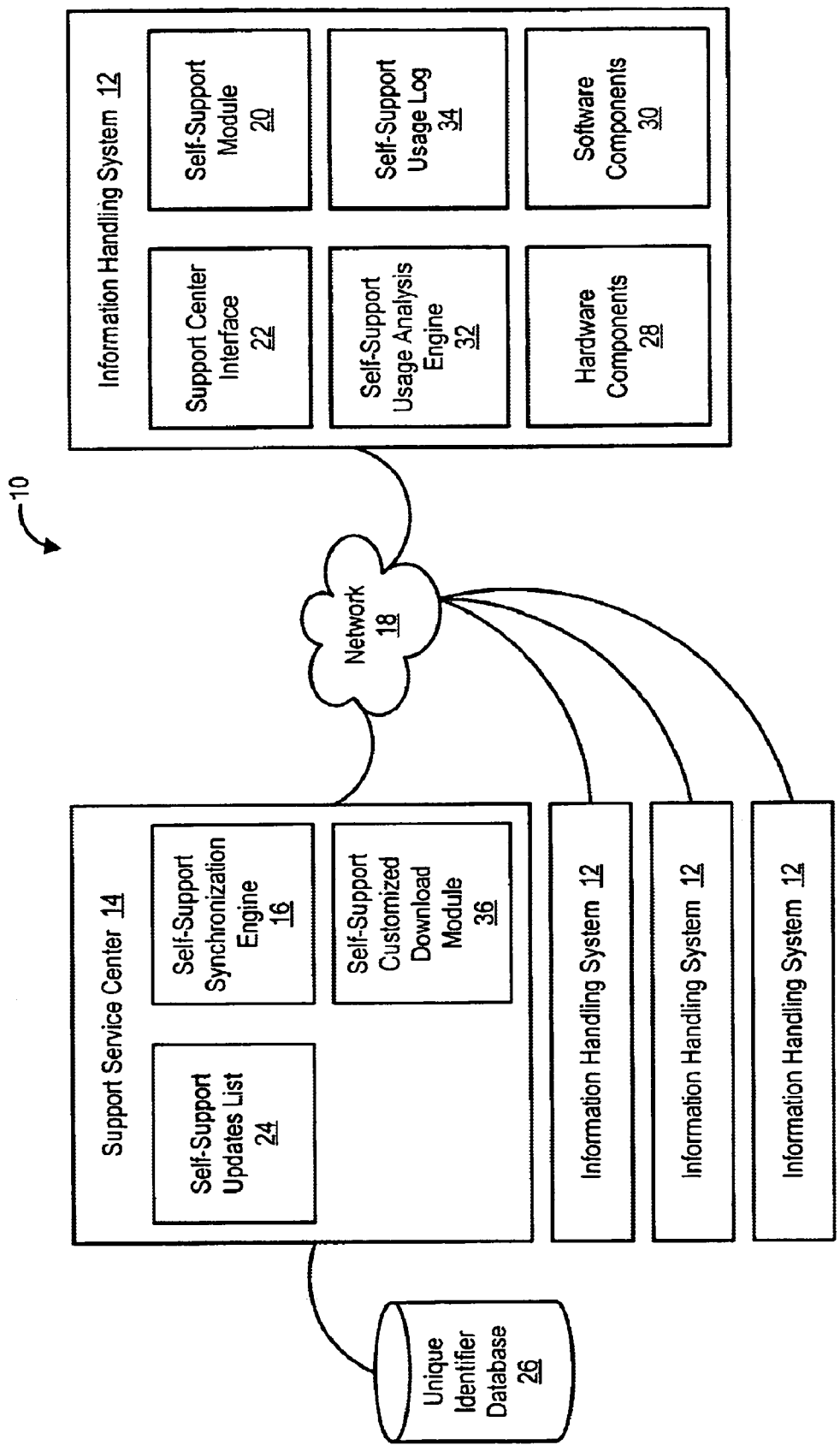
FIG. 1 depicts block diagram depicts a system for selective updates of an information handling system's self-support.

Referring now to FIG. 1, a block diagram depicts a self-support content synchronization system 10 for selective updates of an information handling system's self-support content. Plural information handling systems 12 interface with a support service center 14 available at a network location, such as a location available through the Internet 18. Support service center 14 includes a self-support synchronization engine 16 that periodically updates self-support content of information handling systems 12 by downloading self-support content made available since each information handling system's most recent update. For instance, at regular time intervals a self-support module 20 contacts self-support synchronization engine 16 through a support center interface 22 to download self-support updates made available during the time interval. The synchronization of content for a particular information handling system 12 is performed by reference to a time stamp of the previous download of self-support updates provided to self-support synchronization engine 16 with a request for updates by self-support module 20 and compared with time stamps in a self-support updates list 24. Alternatively, a unique identifier for each information handling system is provided with requests for self-support updates to allow reference to a unique identifier database 26. Self-support updates based on the unique identifier target the associated information handling system's configuration of hardware components 28 and software components 30.

In order to reduce the size of self-support updates sent to a particular information handling system, a self-support usage analysis engine 32 associated with each information handling system identifies hardware components 28 and software components 30 having a predetermined level of self-support interest by the user and limits the download of self-support updates to updates associated with these identified components. For instance, a self-support usage log 34 tracks user navigation through self-support module 20, such as requests for self-support for predetermined hardware and software component categories. As an example, a user inquiry to self-support module 20 for help with a modem problem is tracked in a communication category, a user inquiry to self-support module 20 for help with a video card or display problem is tracked in a video display category, and a user inquiry to self-support module 20 for help with an operating system problem is tracked in an operating system category. Alternatively, use of hardware components and software components is tracked to determine those components most commonly used or otherwise most likely for a user to request self-support.

Self-support usage analysis engine 32 analyzes log entries of self-support usage log 34 for a defined time period to identify categories of self-support information of interest to the user. For instance, a log of navigation by a user through self-support module 20 is used to generate a self-support update matrix by associating each log entry with a hardware or software component category. Specific navigation locations may be provided with varied weights to allocate relative importance of the category. The self-support update matrix is then communicated to a self-support customized download module 36, such as in an XML file. Self-support customized download module 36 customizes a download of self-support updates adapted to the navigation of the user through self-support module 20. The size of the self-support update is reduced by limiting the download to updates associated with the categories identified in the self-support update matrix. For instance, if a user has navigated through areas of self-support module 20 associated with modems, then self-support customized download module 36 selects self-support updates associated with communication devices, such as the communication devices of the hardware configuration associated with the information handling system's unique identifier. In contrast, if the user has not navigation through areas of self-support module 20 associated with video cards, then self-support customized download module 36 does not select self-support updates associated with video display devices.

Figure 2:
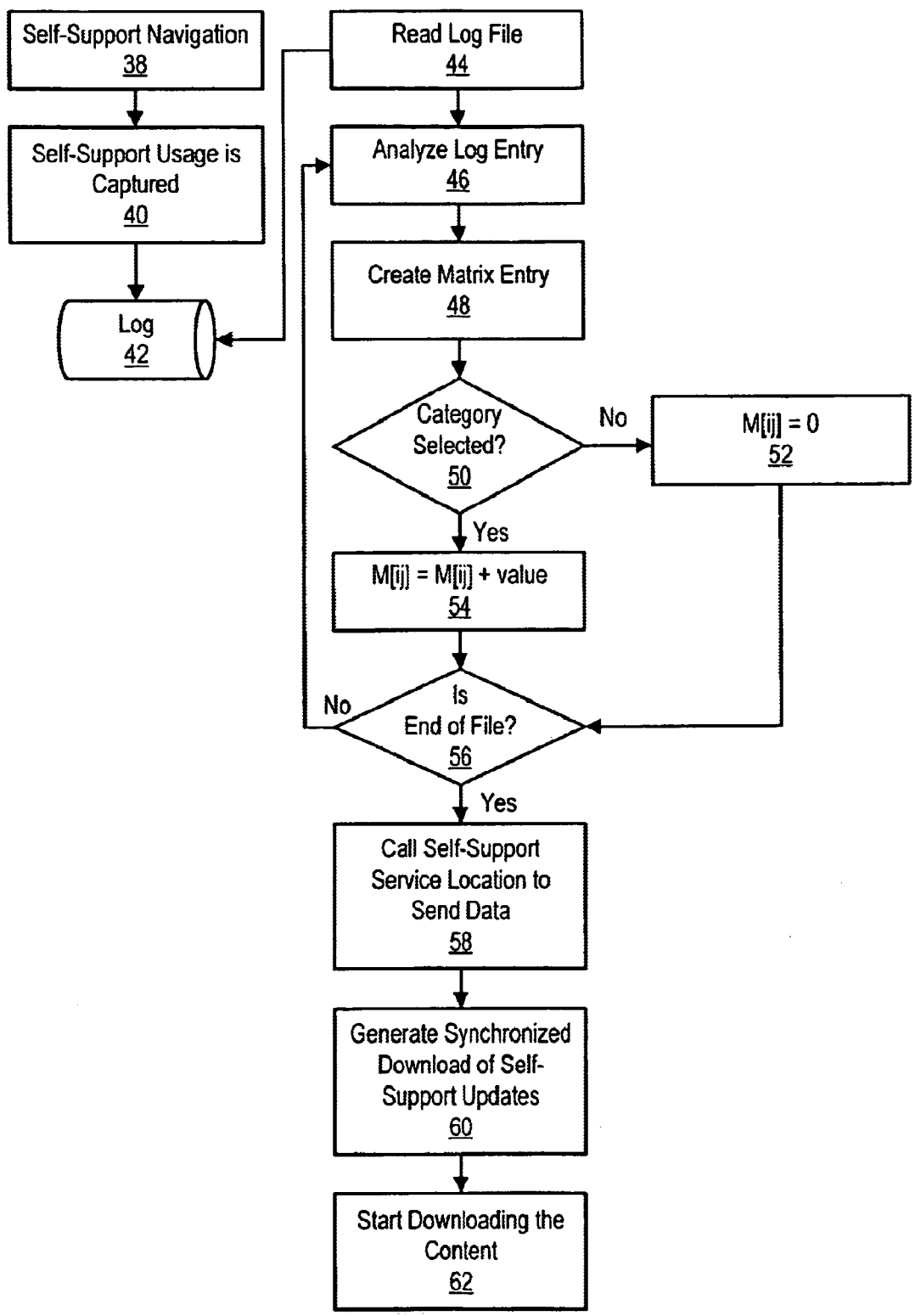
FIG. 2 depicts a flow diagram depicts a process for selective updates of an information handling system's self-support.

Referring now to FIG. 2, a flow diagram depicts a process for selective updates of an information handling system's self-support content. The process begins at step 38 with navigation by a user through a self-support application at an information handling system. At step 40, the user's navigation is captured and stored at step 42 in a log. At predetermined time intervals, the process continues at step 44 with analysis of the log to identify self-support categories to update. At step 44, the navigation log is read. At step 46, the first log entry is analyzed to associate the area of the self-support application navigated by the user with one or more component categories. At step 48, a matrix entry for the log entry and associated categories is created. At step 50, a determination is made of whether the associated categories are among the categories involved in selective self-support updates. If no, the process continues to step 52 where at value of zero is added to the self-support matrix for the log entry. If the determination at step 50 is yes, the process continues to step 54 for a calculation of a value to add to the self-support matrix. At step 56, if the end of the log file is not reached, the process returns to step 46 to repeat until the end of the log file is complete. The values are generated to cumulate at step 54 as a percentage from 0 to 100% based on the number of times a category has been selected by navigation of the information handling system user. For instance, if two of three log entries are associated with a communications device category, the value of the matrix at the communications device cell is ⅔ or 67%.

Once the self-support analysis matrix is complete at step 56, the process continues to step 58 to call the self-support service location to obtain self-support updates for identified categories of the self-support matrix. For instance, categories having values of zero are flagged to restrict download of self-support updates associated with those categories. At step 60, the self-support network location generates a synchronized download of self-support updates for the categories identified by the matrix. At step 62, the synchronized content of self-support updates is downloaded from the network location to the information handling system.

Although the present invention has been described in detail, it should be understood that various changes, substitutions and alterations can be made hereto without departing from the spirit and scope of the invention as defined by the appended claims.

What is claimed is:

1. A system for customized information handling system self-support updates, the system comprising:
   a support center having information handling system self-support updates, each update associated with one or more information handling system components;
   a self-support synchronization engine associated with the support center and operable to periodically generate self-support updates for download to information handling systems;
   plural information handling systems operable to interface with the support center and download self-support updates;
   a self-support module associated with each information handling system and operable to display self-support information responsive to user inputs, the self-support information for display to the user to aid in the use of the information handling system;
   a self-support usage analysis engine associated with each information handling system and operable to analyze user inputs to the self-support module for a predetermined usage level and time period to display the self-support information; and
   a self-support customized download module interfaced with the self-support synchronization engine and operable to accept analyzed user inputs from the self-support usage analysis engine to determine self-support updates for download to the information handling system.

2. The system of claim 1 wherein the self-support usage analysis engine associates the user inputs with component categories.

3. The system of claim 2 wherein the self-support usage analysis engine identifies component categories having no user inputs and the self-support customized download module restricts downloads associated with the identified component categories.

4. The system of claim 3 wherein the self-support usage analysis engine is further operable to communicate user input analysis as an XML file.

5. The system of claim 1 wherein the self-support usage analysis engine is further operable to analyze user inputs that perform actions with components.

6. The system of claim 5 wherein the self-support usage analysis engine identifies components having predetermined usage levels for updating self-support associated with the identified components.

7. A method for customized information handling system self-support updates, the method comprising:
   tracking user inputs to the information handling system;
   analyzing the user inputs to associate each user input with one or more component categories;
   identifying component categories having a predetermined level of self-support requests made in a predetermined time period for self-support updates, the self-support updates having self-support content for display to the user to aid the user in operation of the information handling system;
   requesting self-support updates for the information handling system from a network location having self-support updates for the component categories; and
   selectively downloading self-support updates associated with the identified component categories.

8. The method of claim 7 wherein tracking user inputs further comprises tracking user inputs to a self-support application of the information handling system.

9. The method of claim 8 wherein the user inputs to the self-support application comprises self-support requests associated with the identified component categories.

10. The method of claim 7 wherein tracking user inputs further comprises tracking user inputs associated with usage of components in the component categories.

11. The method of claim 7 wherein requesting self-support updates further comprises sending an XML file to the network location having the identified component categories.

12. An information handling system comprising:
   hardware components operable to process information;
   software components operable to perform operations by processing information on the hardware components;
   a self-support module operable to provide self-support content for presentation to aid a user in the operation of the information handling system and further operable to periodically download self-support updates from a network location, each update associated with one or more hardware or software components; and
   a usage analysis engine operable to track user inputs to the information handling system for a predetermined time period and to associate the user inputs with hardware and software components to identify self-support updates to selectively download from the network location.

13. The information handling system of claim 12 wherein the usage analysis engine tracks user input requests to the self-support module for aid in operation of hardware components.

14. The information handling system of claim 12 wherein the usage analysis engine tracks user input requests to the self-support module for aid in operation of software components.

15. The information handling system of claim 12 wherein the usage analysis engine tracks user inputs to perform operations with hardware components.

16. The information handling system of claim 12 wherein the usage analysis engine tracks user inputs to perform operations with software components.

17. The information handling system of claim 12 wherein the usage analysis engine analyzes user inputs for a predetermined time period in a log file and the self-support module periodically communicates the log file to the network location as an XML file.

* * * * *